United States Patent
Jang et al.

(10) Patent No.: US 12,456,767 B2
(45) Date of Patent: Oct. 28, 2025

(54) WASTE BATTERY TREATMENT METHOD

(71) Applicant: LG Energy Solution, Ltd., Seoul (KR)

(72) Inventors: Eun Su Jang, Daejeon (KR); Jeong Kyu Kim, Daejeon (KR); Bon Sik Joo, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 779 days.

(21) Appl. No.: 17/640,379

(22) PCT Filed: Sep. 24, 2020

(86) PCT No.: PCT/KR2020/012960
§ 371 (c)(1),
(2) Date: Mar. 4, 2022

(87) PCT Pub. No.: WO2021/060873
PCT Pub. Date: Apr. 1, 2021

(65) Prior Publication Data
US 2022/0302515 A1    Sep. 22, 2022

(30) Foreign Application Priority Data

Sep. 25, 2019   (KR) .................. 10-2019-0118391
Sep. 23, 2020   (KR) .................. 10-2020-0123371

(51) Int. Cl.
*H01M 10/54*    (2006.01)
*C01F 7/47*      (2022.01)
(Continued)

(52) U.S. Cl.
CPC .............. *H01M 10/54* (2013.01); *C01F 7/47* (2013.01); *C22B 7/007* (2013.01); *H01M 4/661* (2013.01)

(58) Field of Classification Search
CPC ........ H01M 10/54; H01M 4/661; H01M 6/52; H01M 4/66; C01F 7/47; C01F 7/42;
(Continued)

(56) References Cited

U.S. PATENT DOCUMENTS

2004/0028585 A1*  2/2004  Cardarelli ............. H01M 10/54
                                                              423/66
2014/0102256 A1   4/2014  Mori et al.
(Continued)

FOREIGN PATENT DOCUMENTS

CN    104321915 A    1/2015
CN    106684489 A    5/2017
(Continued)

OTHER PUBLICATIONS

JP-2019135321-A, machine translation. (Year: 2019).*
(Continued)

*Primary Examiner* — John A Hevey
(74) *Attorney, Agent, or Firm* — Morgan, Lewis & Bockius LLP

(57) ABSTRACT

The present invention relates to a waste battery treatment method which includes preparing a waste battery including a waste positive electrode which includes an aluminum current collector and a positive electrode active material layer formed on at least one surface of the aluminum current collector, heat treating the waste battery at a temperature of 650° C. or higher in an air atmosphere or oxidizing atmosphere to convert the aluminum current collector into aluminum oxide, and recovering aluminum oxide powder and positive electrode active material powder from the heat-treated waste battery.

20 Claims, 3 Drawing Sheets

(51) Int. Cl.
  *C22B 7/00* (2006.01)
  *H01M 4/66* (2006.01)
(58) Field of Classification Search
  CPC ......... C22B 7/007; C22B 7/001; C22B 7/005;
  C01P 2004/60
  See application file for complete search history.

(56) References Cited

U.S. PATENT DOCUMENTS

| | | | |
|---|---|---|---|
| 2014/0264185 | A1 | 9/2014 | Kim et al. |
| 2014/0377658 | A1 | 12/2014 | Kim et al. |
| 2022/0017989 | A1* | 1/2022 | Beer ................. C22B 26/12 |
| 2022/0302515 | A1 | 9/2022 | Jang et al. |

FOREIGN PATENT DOCUMENTS

| | | | |
|---|---|---|---|
| CN | 106935924 A | | 7/2017 |
| JP | H08-022846 A | | 1/1996 |
| JP | 3452769 B2 | | 9/2003 |
| JP | 2013-080595 A | | 5/2013 |
| JP | 2015-185471 A | | 10/2015 |
| JP | 2017-084681 A | | 5/2017 |
| JP | 2019135321 A | * | 8/2019 |
| JP | 2020-64855 A | | 4/2020 |
| JP | 2022-547698 A | | 11/2022 |
| KR | 10-0425554 B1 | | 4/2004 |
| KR | 100448273 B1 | * | 9/2004 |
| KR | 10-0475588 B1 | | 3/2005 |
| KR | 10-2011-0117024 A | | 10/2011 |
| KR | 10-2013-0112069 A | | 10/2013 |
| KR | 10-1349900 B1 | | 1/2014 |
| KR | 10-1439427 B1 | | 9/2014 |
| KR | 10-1621312 B1 | | 5/2016 |

OTHER PUBLICATIONS

KR-100448273-B1, machine translation. (Year: 2004).*
International Search Report issued in corresponding International Patent Application No. PCT/KR2020/012960 dated Jan. 11, 2021.
Notice of Opposition issued Mar. 1, 2024 for Japanese Patent Application No. 2024-700197.
Chinese Office Action dated Sep. 29, 2024 issued in Chinese Patent Application No. 2020800639305.
Office Action issued in corresponding JP Patent Application No. 2022-516142 dated Apr. 3, 2023.
Office Action issued on Mar. 3, 2025 in Korean Patent Application No. 10-2020-0123371.

* cited by examiner

WASTE BATTERY TREATMENT METHOD

TECHNICAL FIELD

The present invention relates to a waste battery treatment method, and more particularly, to a waste battery treatment method developed so that a waste positive electrode may be powdered and recycled in a simple process without using comminution equipment.

BACKGROUND ART

A lithium secondary battery is a secondary battery generally composed of a positive electrode including a positive electrode active material, a negative electrode including a negative electrode active material, a separator, and an electrolyte, wherein charge and discharge are performed by intercalation-deintercalation of lithium ions. Since the lithium secondary battery is advantageous in that it has high energy density and high electromotive force and may exhibit high capacity, it has been used in various fields.

The positive electrode of the lithium secondary battery includes a positive electrode active material layer formed on a surface of a positive electrode collector, and the positive electrode active material contains transition metals, such as nickel, cobalt, and manganese, along with lithium, wherein the nickel and cobalt are relatively expensive metals, and particularly, since the number of countries producing cobalt is limited, the cobalt is known as a metal whose supply and demand are globally unstable. Thus, in a case in which a valuable metal contained in the positive electrode active material is recovered from a waste battery, especially a waste positive electrode, and recycled as a raw material, price competitiveness may not only be secured, but additional revenue may also be generated. Recently, studies on a method of recovering and recycling a valuable metal from a waste battery have been attempted.

Conventionally, in order to recover a valuable metal from a waste battery, a melting method has been studied in which the waste battery is thermally decomposed by putting it into a high-temperature furnace and the valuable metal in the waste battery is recovered by being melted and prepared in the form of an alloy. However, the above-described melting method requires a high energy cost, and has a disadvantage in terms of processing costs due to the incurrence of equipment investment cost and waste gas treatment cost.

Thus, in order to reduce the processing costs, a method has been studied in which, after performing a pretreatment process in which a waste electrode is powdered by grinding a waste battery by mechanical friction using comminution equipment and classifying, the powder is introduced into an acidic solution to extract a valuable metal. FIG. 1 illustrates a conventional waste battery pretreatment process using comminution equipment. As illustrated in FIG. 1, the conventional pretreatment process according to a mechanical comminution method is performed in such a manner that, after a waste battery is primarily shredded (coarse grinding, shredding) and then heat-treated to remove a binder component or electrolyte solution components, the waste battery is comminuted and finely ground through secondary grinding and classification processes to make fine powder at micrometer level.

However, with respect to the mechanical comminution method, there is a risk of fire and dust explosion when the micron-level fine powder is in contact with lithium metal contained in the battery and moisture, and, since a large amount of a material (e.g., aluminum) contained in the positive electrode collector is included as an impurity in the finally-recovered powder as the positive electrode collector is also ground during the comminution, a separate impurity removal process must be performed on the recovered powder, wherein there is a limitation in that a recovery rate of valuable metal is reduced due to the loss of the valuable metal during the above refining process. Also, it is necessary to additionally install comminution/fine grinding equipment to form fine powder.

Thus, there is a need to develop a waste battery treatment method capable of reducing the processing costs and effectively recycling the positive electrode active material without using the comminution/fine grinding equipment.

PRIOR ART DOCUMENT (Patent Document 1) Japanese Patent Application Laid-open Publication No. 2015-185471

DISCLOSURE OF THE INVENTION

Technical Problem

An aspect of the present invention provides a waste battery treatment method which may efficiently recycle a positive electrode active material by powdering a waste battery without facilities such as comminution/fine grinding equipment.

Technical Solution

According to an aspect of the present invention, there is provided a waste battery treatment method which includes: preparing a waste battery including a waste positive electrode which includes an aluminum current collector and a positive electrode active material layer formed on at least one surface of the aluminum current collector; heat treating the waste battery at a temperature of 650° C. or higher in an air atmosphere or an oxidizing atmosphere to convert the aluminum current collector into aluminum oxide; and recovering aluminum oxide powder and positive electrode active material powder from the heat-treated waste battery.

Advantageous Effects

A waste battery treatment method of the present invention allows a positive electrode collector and a positive electrode active material to be powdered without a comminution process by converting aluminum contained in the aluminum current collector into aluminum oxide powder through a heat treatment of a waste battery including a waste positive electrode at a temperature of 650° C. or higher in an air atmosphere or oxidizing atmosphere. Thus, according to the method of the present invention, it is advantageous for cost reduction because additional equipment for a grinding process is not required, and stability is excellent due to a decrease in the risk of explosion in the grinding process.

Also, according to the method of the present invention, since the aluminum current collector is converted into aluminum oxide that is not easily leached in an acidic solution, an amount of aluminum leached in the acidic solution is significantly reduced. Thus, since an aluminum refining process may be minimized during leaching of valuable metal and, accordingly, loss of the valuable metal in the aluminum refining process may be minimized, a recovery rate of the valuable metal may be improved.

As described above, according to the waste battery treatment method of the present invention, since the waste battery may be powdered without using comminution equipment, the positive electrode active material may be efficiently recycled by a simple process and excellent effects in terms of processing costs and process safety may be obtained.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Hereinafter, a waste battery treatment method according to the present invention will be described in detail.

The waste battery treatment method according to the present invention includes the steps of: (1) preparing a waste battery including a waste positive electrode which is composed of a positive electrode active material layer formed on a surface of an aluminum current collector, (2) heat treating the waste battery at a temperature of 650° C. or higher in an air atmosphere or an oxidizing atmosphere to convert the aluminum current collector into aluminum oxide, and (3) recovering aluminum oxide powder and positive electrode active material powder from the heat-treated waste battery.

Figure 1:
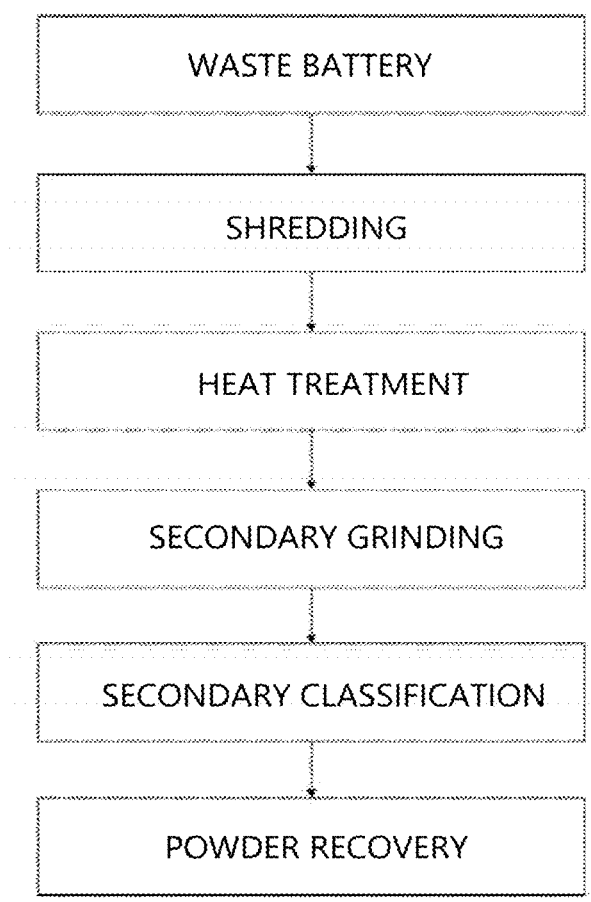
FIG. 1 is a flowchart illustrating a conventional waste battery treatment process.
Figure 2:
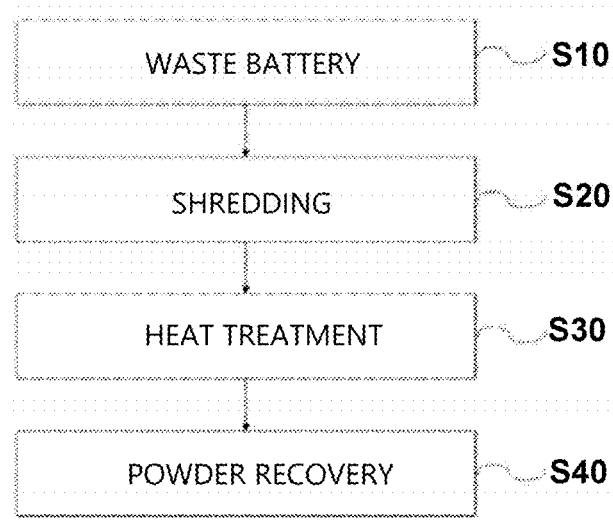
FIG. 2 is a flowchart illustrating a waste battery treatment process according to the present invention.

FIG. 2 is a flowchart for explaining the waste battery treatment method of the present invention.

Hereinafter, each step of the present invention will be described in more detail together with FIG. 2.

First, a waste battery including a waste positive electrode is prepared (S10).

The waste battery in the present invention is a concept including all of an electrode scrap generated in a secondary battery preparation process, a battery with defects generated in the secondary battery preparation process, or a secondary battery discarded after use.

The waste battery may include a waste positive electrode, and, in this case, the waste positive electrode includes an aluminum current collector and a positive electrode active material layer formed at least one surface of the aluminum current collector. The waste battery may further include a waste negative electrode, if necessary.

The positive electrode active material layer may include a positive electrode active material, a binder, and/or a conductive agent.

The positive electrode active material may be a general positive electrode active material used in the art, and, for example, may be a lithium transition metal oxide.

Preferably, the positive electrode active material may be a positive electrode active material including lithium and at least one transition metal of nickel, cobalt, and manganese. As a specific example, the positive electrode active material may include lithium cobalt oxide ($LiCoO_2$); lithium nickel oxide ($LiNiO_2$); $Li[Ni_aCo_bMn_cM^1_d]O_2$ (where $M^1$ is at least one element selected from the group consisting of aluminum (Al), gallium (Ga), and indium (In), $0.3 \leq a < 0.1$, $0 \leq b \leq 0.5$, $0 \leq c \leq 0.5$, $0 \leq d \leq 0.1$, and $a+b+c+d=1$); a layered compound, such as $Li(Li_eM^2_{f-e-f}M^3_f)O_{2-g}A_g$ (where $0 \leq e \leq 0.2$, $0.6 \leq f \leq 1$, $0 \leq f' \leq 0.2$, $0 \leq g \leq 0.2$, $M^2$ includes manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \leq h \leq 0.33$), $LiMnO_3$, $LiMn_2O_3$, and $LiMnO_2$; Ni-site type lithium nickel oxide represented by the chemical formula $LiNi_{1-i}M^4_iO_2$ (where $M^4$=Co, Mn, Al, Cu, Fe, Mg, B, or Ga, and $0.01 \leq i \leq 0.3$); lithium manganese composite oxide represented by the chemical formula $LiMn_{2-j}M^5_j O_2$ (where $M^5$=Co, Ni, Fe, Cr, Zn, or tantalum (Ta), and $0.01 \leq j \leq 0.1$) or $Li_2Mn_3M^6O_8$ (where $M^6$=Fe, Co, Ni, Cu, or Zn); or $LiMn_2O_4$ having a part of lithium (Li) being substituted with alkaline earth metal ions. Preferably, the positive electrode active material may be a lithium nickel cobalt manganese oxide including nickel, cobalt, and manganese as transition metals.

The binder functions to improve binding between electrode active material particles and adhesion between the electrode active material and the current collector, wherein common electrode binders used in the art may be used. Specific examples of the binder may be polyvinylidene fluoride (PVDF), a polyvinylidene fluoride-hexafluoropropylene copolymer (PVDF-co-HEP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluoro rubber, or various copolymers thereof, and one alone or a mixture of two or more thereof may be used.

The conductive agent is used for providing conductivity to the electrode, wherein any conductive agent may be used without particular limitation as long as it has electronic conductivity without causing adverse chemical changes in the battery. Specific examples of the conductive agent may be graphite such as natural graphite and artificial graphite; a carbon-based material such as carbon black, acetylene black, Ketjen black, channel black, furnace black, lamp black, thermal black, and carbon fibers; metal powder, such as copper powder, nickel powder, aluminum powder, and silver powder, or metal fibers; conductive whiskers such as zinc oxide whiskers and potassium titanate whiskers; conductive metal oxide such as titanium oxide; or conductive polymers such as polyphenylene derivatives, and one alone or a mixture of two or more thereof may be used.

Also, in a case in which the waste battery includes a waste negative electrode, the waste negative electrode includes a copper current collector and a negative electrode active material layer disposed on the copper current collector. The negative electrode active material layer may selectively include a binder or a conductive agent together with a negative electrode active material. In this case, the binder or the conductive agent included in the negative electrode active material layer is the same as described in the above-described positive electrode.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; or a composite including the metallic compound and the carbonaceous material such as a Si—C composite or a Sn—C composite, and any one thereof or a mixture of two or more thereof may be used.

In a case in which the waste battery is a secondary battery discarded after use, the waste battery may include an electrolyte solution. If the electrolyte solution is included in the waste battery as described above, a step of removing the electrolyte solution from the waste battery and deactivating the battery may be performed in the preparing of the waste battery. The electrolyte solution removal and battery deactivation step, for example, may be performed by a method in which the waste battery is punched or cut and then stored in brine. However, the above step is not essential, and is unnecessary for an electrode scrap or a waste battery that does not include an electrolyte solution.

When the waste battery is prepared through the above process, a shredding process may be performed (S20), if necessary. The shredding process may be performed by a method in which the waste battery is shredded (coarse ground) to a size of a few tens to a few hundreds of mm. The shredding process is not essential, but, when the shredding process is performed, since a reaction area is increased during the heat treatment, the waste battery may be powdered more smoothly.

Subsequently, the waste battery is heat-treated (S30). The heat treatment is performed at a temperature of 650° C. or higher in an air atmosphere or an oxidizing atmosphere. In a case in which the heat treatment is performed in the above-described atmosphere and temperature range, the aluminum current collector included in the waste positive electrode is converted into aluminum oxide ($Al_2O_3$) while being melted.

In this case, the heat treatment atmosphere may specifically be an air atmosphere or oxygen atmosphere containing 21 mol % to 99 mol % of oxygen. In a case in which the heat treatment is performed in an inert atmosphere or vacuum other than the air or oxidizing atmosphere, since an oxidation reaction of aluminum does not occur even if the heat treatment is performed at a temperature of 650° C. or higher, no conversion to the aluminum oxide occurs.

The heat treatment temperature may be in a range of 650° C. or higher, for example, 650° C. to 1,080° C. In a case in which the waste battery is heat-treated at a temperature of 650° C. or higher, the aluminum current collector is converted into aluminum oxide while being melted, and the aluminum current collector is powdered due to such a composition change. Also, in the case that the heat treatment temperature satisfies the above range, since the binder included in the positive electrode active material layer is vaporized during a heat treatment process, a binding force between the positive electrode active material particles is reduced, and thus, the positive electrode active material layer is also powdered.

In a case in which the heat treatment temperature is less than 650° C., since all of aluminum present on the surface of the aluminum current collector are not converted into aluminum oxide, but only a portion thereof is converted into aluminum oxide, the aluminum current collector maintains a plate shape and is not powdered. In the case that the waste battery includes a waste negative electrode, the heat treatment may be performed at a temperature of 1,080° C. or less, a melting temperature of the copper current collector. The reason for this is that, in a case in which the heat treatment is performed at a temperature higher than the melting temperature of the copper current collector, since the copper current collector is melted during the heat treatment, an impurity due to the introduction of copper may be generated. In a case in which the impurity due to the introduction of copper is generated, a refining process for removing the copper may be required, and a loss of valuable metal may occur in this process to reduce a recovery rate.

Also, in the method according to the present invention, it is not essential, but, if the waste battery includes a waste negative electrode, a step of removing carbon in the negative electrode active material layer of the waste negative electrode may be further performed. Specifically, the step of removing the carbon in the negative electrode active material layer may be performed by a method in which the waste battery is heat-treated at a temperature of 250° C. to 500° C.

For example, the step of removing the carbon may be performed by preliminarily heat treating the waste battery at a temperature of 200° C. to 500° C. before the above-described heat treating at a temperature of 650° C. or higher.

Also, the step of removing the carbon may be performed through a method in which the heat treating at a temperature of 650° C. or higher is performed by a multi-stage heating method.

In this case, the preliminary heat treatment may be performed at a temperature of less than 650° C., for example, 250° C. to 500° C., and may be performed in an oxidizing atmosphere or air atmosphere. The multi-stage heating, for example, may include performing a heat treatment by secondarily heating the waste battery to a temperature range of 650° C. or higher, after primarily heating the waste battery to a temperature range of 250° C. to 500° C. and performing a heat treatment while the temperature is maintained for a certain period of time. As described above, in a case in which the preliminary heat treatment is performed or the multi-stage heating is performed, the carbon in the negative electrode active material layer reacts with oxygen to be converted into carbon monoxide or carbon dioxide and is discharged in a gaseous state. In a case in which the heat treatment temperature of the carbon removal step satisfies the above range, a phenomenon of excessive local heat generation due to the reaction of carbon and oxygen may be prevented, and the carbon in the negative electrode active material layer may be effectively removed.

The heat treatment, for example, may be performed by charging the waste battery into a heat treatment furnace equipped with a heat source and then heating it. Any heat treatment furnace may be used without particular limitation as long as it has a space in which the waste battery may be charged, includes a heat source inside or outside the heat treatment furnace, includes a feeding path, through which the waste battery may be fed, at one side of the heat treatment furnace, and has a discharge section from which the product after completion of the reaction may be recovered, but may induce an oxidation reaction, and, for example, any one of a muffle furnace, a hearth furnace, and a rotary kiln furnace may be used. Also, a gas burner, a coal burner, a resistance heating element, or an infrared (IR) lamp may be used as the heat source, but the heat source is not limited thereto.

Next, aluminum oxide powder and positive electrode active material powder are recovered from the heat-treated waste battery (S40).

As described above, in the case that the heat treatment is performed at a temperature of 650° C. or higher in an air or oxidizing atmosphere, the aluminum current collector is converted into aluminum oxide ($Al_2O_3$) while being melted, physical properties, such as hardness and brittleness, of the current collector are also changed due to such a composition change, and the converted aluminum oxide is converted into spherical fine particles. Since a binding force between the particles of the current collector converted into the aluminum oxide particles is weak, the current collector is easily powdered even with a small impact. Also, the binder binding the active material particles is desorbed from the current collector while being evaporated during the heat treatment process and is powdered. Thus, according to the method of the present invention, aluminum oxide powder and positive electrode active material powder may be easily recovered from the heat-treated waste battery even if there is no separate comminution equipment.

In this case, the aluminum oxide powder may have a particle diameter of a few mm or less, for example, 10 mm or less, preferably 5 mm or less, and more preferably about 0.1 mm to about 5 mm. In a case in which the particle diameter of the aluminum oxide powder exceeds the above range and is large, the positive electrode active material powder may be hardened by being included in the aluminum oxide powder, and, if the positive electrode active material is confined in the aluminum oxide powder, since the valuable metal may not be easily recovered in a leaching process using an acidic solution in the valuable metal recovery step to be described later, the recovery rate of the valuable metal may be reduced.

In the waste battery treatment method of the present invention, a post processing of recovering the valuable metal from the powder recovered through the above-described process may be additionally performed, if necessary.

Specifically, a step of recovering a valuable metal from the positive electrode active material powder by adding the recovered positive electrode active material powder and aluminum oxide powder to an acidic solution may be further performed.

In this case, the acidic solution may be a strong acid solution, for example, a sulfuric acid solution or a nitric acid solution. When the positive electrode active material powder and the aluminum oxide powder are added to the acidic solution, valuable metals in the positive electrode active material powder are leached into the acidic solution. However, since aluminum oxide forms a strong ionic bond with oxygen, it is not easily leached into the acidic solution and most of the aluminum oxide precipitate in the form of a residue in the acidic solution. Accordingly, the valuable metals in the positive electrode active material powder are mostly leached in the acidic solution, and an amount of aluminum leached is significantly small. Thus, valuable metals having a low impurity content may be recovered without undergoing a refining process of extracting aluminum from a leachate.

In a case in which the current collector and the positive electrode active material layer are powdered by a conventional mechanical comminution method, aluminum included in the current collector is included in the recovered powder, wherein aluminum is precipitated in the form of a salt in an acidic solution with a pH of 4 or more. Thus, conventionally, after dissolving the positive electrode active material powder in an acidic solution, it is general to adjust a pH of the solution to about 4 to about 6 to precipitate aluminum, and perform a valuable metal leaching process after removing the aluminum precipitate. However, in this process, since not only aluminum but also some of valuable metals in the positive electrode active material may be co-precipitated and lost, there is a limitation in that a recovery rate of the finally-recovered valuable metal is reduced. However, according to the method of the present invention, since the aluminum is converted into the aluminum oxide powder, an amount of the aluminum dissolved in the acidic solution is smaller than that of the conventional case, and, accordingly, the above-described aluminum refining process may be omitted or minimized. Thus, according to the method of the present invention, since a loss of the valuable metal may be minimized, a high recovery rate of the valuable metal may be obtained.

In the waste battery treatment method of the present invention, a step of separating the aluminum oxide from the acidic solution may be additionally performed, if necessary. In this case, the step of separating the aluminum oxide, for example, may include separating the aluminum oxide, as the residue, from the acidic solution through a filtration and washing process. In a case in which the above-described step of separating the aluminum oxide is performed, an amount of impurities in the leachate may be further reduced. It is more preferable that the step of separating the precipitated aluminum oxide is performed in an initial stage of the leaching of the valuable metal.

Hereinafter, the present invention will be described in more detail, according to specific examples.

Example 1

A positive electrode scrap, in which a positive electrode active material layer was formed on an aluminum current collector, was prepared, then charged into a heat treatment furnace, and heat-treated at 650° C. in an air atmosphere.

Figure 3:
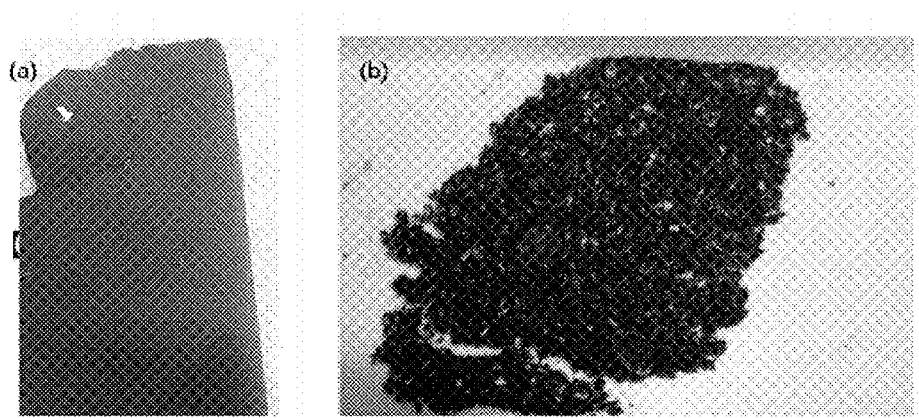
FIG. 3 is photographs showing a change in state before and after a heat treatment of a positive electrode scrap heat-treated by a method of Example 1.

A photograph taken from the positive electrode scrap before the heat treatment (FIG. 3(a)) and a photograph showing a state after the heat treatment (FIG. 3(b)) are illustrated in FIG. 3. Referring to FIG. 3, it may be confirmed that both the current collector and a positive electrode active material were powdered after the heat treatment.

Comparative Example 1

A positive electrode scrap, in which a positive electrode active material layer was formed on an aluminum current collector, was prepared, then charged into a heat treatment furnace, and heat-treated at 600° C. in an air atmosphere.

Figure 4:
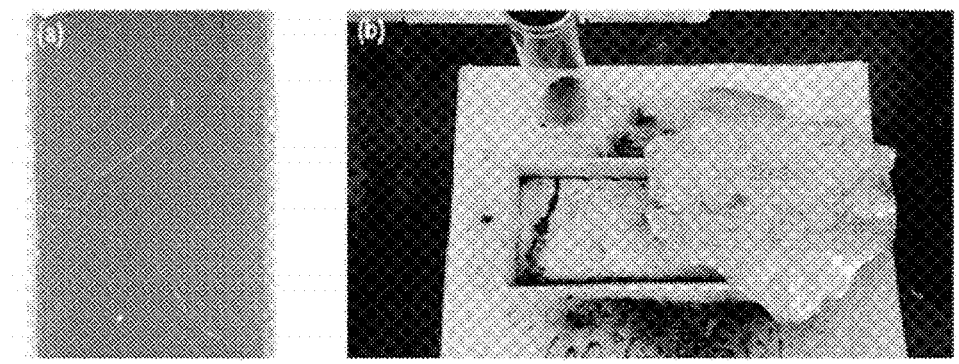
FIG. 4 is photographs showing a change in state before and after a heat treatment of a positive electrode scrap heat-treated by a method of Comparative Example 1.

A photograph taken from the positive electrode scrap before the heat treatment (FIG. 4(a)) and a photograph showing a state after the heat treatment (FIG. 4(b)) are illustrated in FIG. 4. Referring to FIG. 4, it may be confirmed that, when the heat treatment was performed at 600° C., the positive electrode active material layer was powdered and exfoliated from the current collector, but the current collector maintained a plate shape as it is.

The invention claimed is:

1. A waste battery treatment method comprising:
preparing a waste battery including a waste positive electrode that includes an aluminum current collector and a positive electrode active material layer formed on at least one surface of the aluminum current collector;
heat treating the waste battery including heat treating the waste battery at a temperature of 650° C. or higher in an air atmosphere or an oxidizing atmosphere to convert the aluminum current collector into aluminum oxide;
recovering aluminum oxide powder and positive electrode active material powder from the heat-treated waste battery; and
recovering a valuable metal from the positive electrode active material powder including adding the recovered positive electrode active material powder and the recovered aluminum oxide powder to an acidic solution to form a leachate, wherein the recovering of the valuable metal is without a process of extracting aluminum from a leachate.

2. The waste battery treatment method of claim 1, wherein the temperature of the heat treatment is from 650° C. to 1,080° C.

3. The waste battery treatment method of claim 1, further comprising shredding the waste battery before the heat treating of the waste battery.

4. The waste battery treatment method of claim 1, wherein the air atmosphere or the oxidizing atmosphere is an atmosphere containing 21 mol % to 99 mol % of oxygen.

5. The waste battery treatment method of claim 1, wherein the waste battery further includes an electrolyte, and
the preparing of the waste battery comprises removing the electrolyte from the waste battery and deactivating the battery.

6. The waste battery treatment method of claim 1, wherein the waste battery further comprises a waste negative electrode including a copper current collector.

7. The waste battery treatment method of claim 6, further comprising removing carbon in a negative electrode active material layer of the waste negative electrode.

8. The waste battery treatment method of claim 7, wherein the removing of the carbon comprises preliminarily heat treating the waste battery at a temperature of from 250° C. to 500° C.

9. The waste battery treatment method of claim 1, wherein the heat treating of the waste battery includes heating the waste battery in multi-stages.

10. The waste battery treatment method of claim 9, wherein the heating of the waste battery in multi-stages comprises secondarily heating the waste battery to the temperature range of 650° C. or higher, after primarily heating the waste battery to a temperature of from 250° C. to 500° C., and heat treating the waste battery while maintaining the temperature of 650° C. or higher for a certain period of time.

11. The waste battery treatment method of claim 1, wherein the aluminum oxide powder recovered from the heat-treated waste battery has a particle diameter of 10 mm or less.

12. The waste battery treatment method of claim 1, further comprising separating aluminum oxide from the acidic solution.

13. The waste battery treatment method of claim 12, wherein the separating of the aluminum oxide comprises separating aluminum oxide, as a residue, from the acidic solution through a filtration and washing process.

14. The waste battery treatment method of claim 1, wherein the acidic solution comprises at least one of sulfuric acid or hydrochloric acid.

15. The waste battery treatment method of claim 1, wherein the waste battery treatment method is free of a comminution process.

16. The waste battery treatment method of claim 15, wherein the aluminum oxide powder recovered from the heat-treated waste battery has a particle diameter of 10 mm or less.

17. The waste battery treatment method of claim 16, wherein the temperature of the heat treatment is from 650° C. to 1,080° C.

18. The waste battery treatment method of claim 17, wherein the heat treating of the waste battery includes heating the waste battery in multi-stages,
wherein the heating of the waste battery in multi-stages comprises secondarily heating the waste battery to the temperature range of 650° C. to 1,080° C., after primarily heating the waste battery to a temperature of from 250° C. to 500° C., and heat treating the waste battery while maintaining the temperature of 650° C. to 1,080° C. for a certain period of time to form the aluminum oxide powder and the positive electrode active material powder.

19. The waste battery treatment method of claim 1, wherein the recovering of the aluminum oxide powder and the positive electrode active material powder is performed directly after the heat treating of the waste battery at the temperature of 650° C. or higher in the air atmosphere or the oxidizing atmosphere.

20. The waste battery treatment method of claim 1, wherein the valuable metal includes lithium.

* * * * *